Sept. 29, 1925.
D. R. CHILDRESS
MILKING MACHINE
Filed Aug. 29, 1923
1,555,553
2 Sheets-Sheet 1
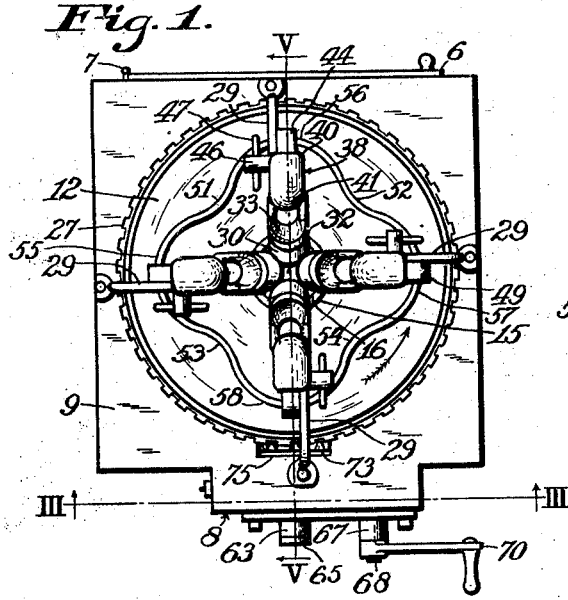

Sept. 29, 1925.
D. R. CHILDRESS
MILKING MACHINE
Filed Aug. 29, 1923   2 Sheets-Sheet 2
1,555,553
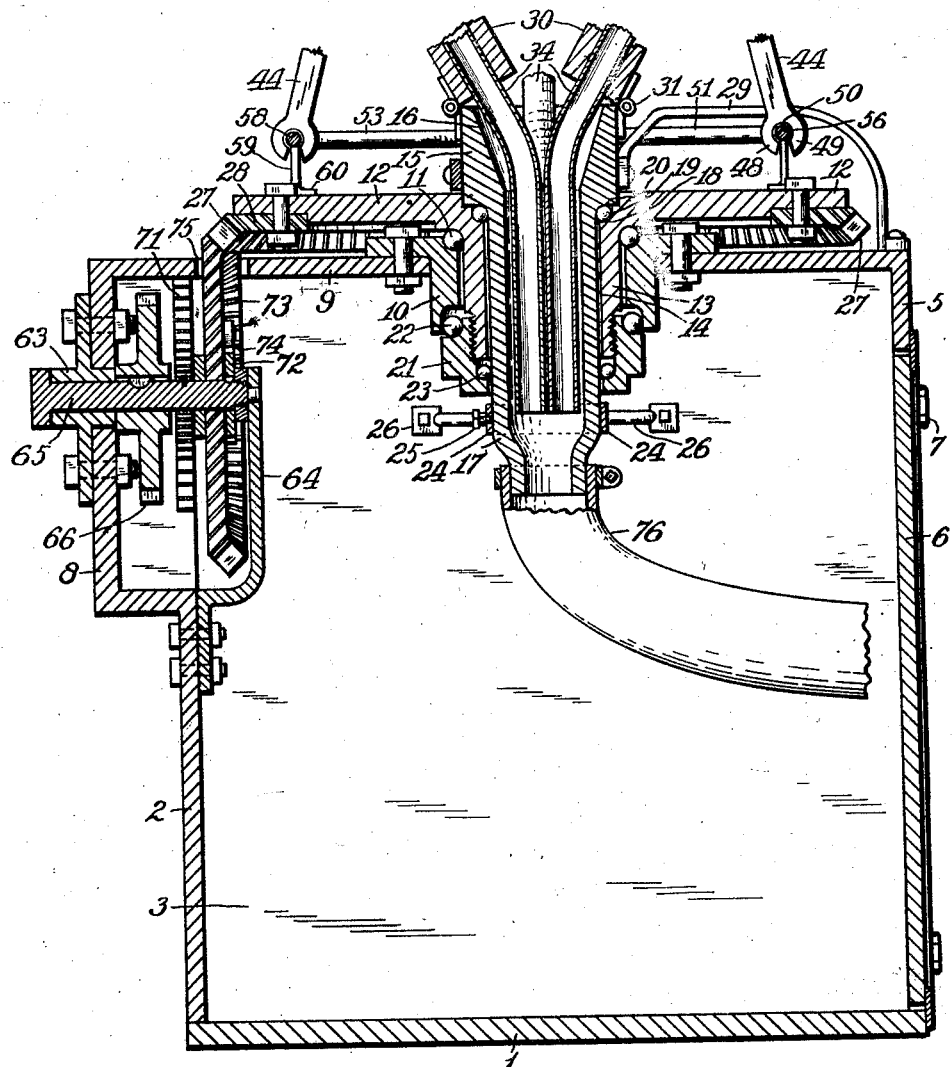
Fig. 5.
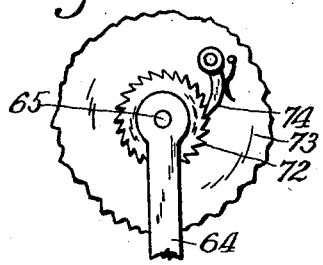
Fig. 6.
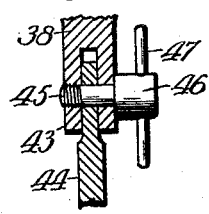
Fig. 7.
Fig. 8.
INVENTOR:
Delana R. Childress,
BY
E. D. Silvius,
ATTORNEY.

Patented Sept. 29, 1925.

1,555,553

UNITED STATES PATENT OFFICE.

DELANA R. CHILDRESS, OF FRANKLIN TOWNSHIP, OWEN COUNTY, INDIANA.

MILKING MACHINE.

Application filed August 29, 1923. Serial No. 660,037.

*To all whom it may concern:*

Be it known that I, DELANA R. CHILDRESS, a citizen of the United States, residing in Franklin Township, in the county of Owen and State of Indiana, have invented a new and useful Milking Machine, of which the following is a specification, reference being had to the accompanying drawings, and to the letters and figures of reference marked thereon.

This invention relates to a portable milking machine that is of a type which is suitable for milking cows expeditiously and in a sanitary manner, the invention having reference more particularly to a milking machine that is designed for milking one cow at a time and having its individual operating mechanism unitarily connected therewith.

An object of the invention is to provide a simple and inexpensive milking machine which shall be suitable for expeditiously milking a small number of cows in succession, and which shall have obtainable at such moderate cost as to justify dairymen in operating as many of the machines as may be desired to save time for milking a large number of dairy cows.

Another object is to provide a milking machine which shall be of such design as to permit of its construction with few and simple parts, and which shall not be liable to become inefficient because of wearing of parts in operation.

A further object is to provide an improved milking machine which shall operate in such manner as to approximate the movements of a human hand while manipulating the cow's teats when milking by hand.

A still further object is to provide an improved milking machine which shall have a driving mechanism connected therewith, so that each machine may be set and put in operation and shall operate automatically while the attendant places other machines and starts operation thereof, which machines shall be adapted to be operated in a simple manner and be durable and economical in use.

With the above-mentioned and other objects in view, the invention consists in a portable stand, in novel milkers mounted in a novel manner on the stand to draw and conduct the milk from a cow's udder, in novel operating and controlling apparatus for the milkers, and in a motor connected in a novel manner with the operating and controlling apparatus; and the invention consists also further in the parts and the combinations and arrangements of parts as hereinafter particularly described and further defined in the claims appended hereto.

Referring to the drawings,—Figure 1 is a top plan of the improved milking machine as preferably constructed; Fig. 2 is a top plan of a turntable constituting, with a guide rail thereon, one of the parts of the operating apparatus which controls the milkers; Fig. 3 is a sectional elevation of the machine approximately on the line III—III in Fig. 1; Fig. 4 is a vertical central section of the principal parts of one of the improved milkers, on an enlarged scale; Fig. 5 is a vertical section of the improved machine approximately on the line V—V in Fig. 1, on an enlarged scale, portions of the milkers being broken away; Fig. 6 is a fragmentary detail of the driving mechanism viewed from the direction opposite to that in which portions of the mechanism is seen in Fig. 3, being on an enlarged scale; Fig. 7 is a sectional detail on an enlarged scale showing co-acting parts of one of the milkers; and, Fig. 8 is a fragmentary elevation showing a possible modification of the guide rail on a turntable.

Similar reference characters in the various figures of the drawings indicate corresponding elements or features of construction herein referred to in detail.

Practically embodied, the invention includes a suitable stand which may be variously constructed and for descriptive purposes is shown as a closed sanitary box comprising a bottom 1, side walls 2, 3 and 4, a door frame 5 in which a door 6 is arranged and supported by hinges 7, the box having a motor housing 8 thereon that is open to the interior of the box, the box having a top or cover 9 which extends over and forms the top of the motor housing. The top 9 preferably is continuous so as to exclude dust from the interior of the box and obviously may in some cases have openings therein when it is not desired to inclose a milk pail in the box. The middle portion of the top 9 has an annular bearing box 10 fixed thereto which extends downward when the stand is made as high as permissible with a milk receptacle under the cover but obviously may extend upward when the stand is relatively lower and not designed to cover the vessel. The inner portion of the bearing box supports suitable anti-friction bearing balls 11 which rotatably support a turntable 12 which may be continuous as a disk or otherwise if desired, the turntable having a central downward extending journal 13 which has a central bore 14 that extends through the main portion of the turntable, the journal being centrally guided in the box 10 by the bearing balls 111. An annular guide head 15 is arranged centrally upon the turntable and has a tapered or funnel-shaped inner upper portion 16, the head having a tubular guide 17 thereon that extends down through the bore 14. The turntable is counterbored and has a bearing ball cup 18 therein in which bearing balls 19 are supported, the head 15 having a bearing shoulder and cone 20 that is guided on the bearing balls. To secure steady motion and prevent tilting of the turntable an annular cap 21 preferably is screwed onto the lower end of the journal 13 and supports bearing balls 22 which operate in a suitable recess in the box 10, the cap supporting another series of bearing balls 23 that operate against the outer side of the hollow guide 17. Preferably a collar 24 is secured by means of a set-screw 25 on the lower portion of the guide 17 below the cap 21, and it has a suitable number of arms 26 fixed thereto that are secured to a side wall portion of the box or stand to steady the guide head 15 and prevent rotation thereof. The turntable has gear teeth 27 on its peripheral portion which preferably are integral with a ring 28 secured to the body of the turntable. A suitable number of bridge bars 29 are secured to the guide head 15 above the turntable and extend outward and thence downward beyond the turntable to the top or cover 9 of the stand to which they are secured, the bars assisting in preventing rotation of the guide head and performing another function which will be described hereinafter.

The machine is provided with a suitable number of hand-like milkers, four being illustrated, and each milker comprises a main part 30 which is connected at one end thereof to the guide head 15 by means of a hinge 31, the main parts being spaced equi-distantly apart on the guide head. Each main part comprises a lower portion that is hollow to receive and conduct milk and a curved upper finger portion 32 which has a longitudinally convex face 33 against which a cow teat is to be pressed, a flexible sanitary discharge tube 34 being connected with the lower portion of the main part and extending into the guide head 15, and preferably to the lower end or nearly to the lower end of the guide tube 17. The discharge tube flares at the upper portion of the main part to readily receive the milk and above the upper end of the main part is partially cut away, the remaining portion thereof extending along the convex portion 33 to constitute a sanitary lining 35 which is concave transversely so as to extend, in effect similarly to a hand partially about the teat. The main part 30 has a jaw 36 adjacent to the top of the hollow portion thereof which is provided with a pivot pin 37. The milker includes also a manipulator or thumb part comprising a body portion 38 which has an ear 39 that is connected to the pivot pin 37, a thumb-like working portion 40 extending upward from the body portion 38 and having a working face 41 that is longitudinally and transversely convex and presented towards the working face of the main part, the working face 41 preferably being on a suitable pad 42 fixed to the working portion 40, to press the teat against the working portion of the main part. The lower end of the body portion 38 has a jaw 43 thereon for operation and control of the manipulator part, and each jaw has an operating rod 44 connected thereto preferably by means of a clamp screw 45 that is rotatable in one blade of the jaw and in the rod that is inserted between the blades of the jaw, the screw being threaded into the opposite jaw blade, the opposite end of the screw having a head 46 thereon provided with a thumb lever 47, whereby to adjustably clamp one end of the operating rod to the manipulator. The opposite end of each operating rod has two curved guide fingers 48 and 49 oppositely arranged and a bearing portion 50 between the fingers, the fingers slidingly embracing a guide rail with which the turntable 12 is provided. The guide rail has cam-like reversely curved portions, as four arcuate portions or sections 51, 52, 53 and 54 that have concave outer sides, and reversely curved portions or sections 55, 56, 57 and 58 that have convex outer sides, and being continuous with the other reversely curved portions, the arrangement being such that when the controlling rod is in connection with the portion 51 or a like section the rod is approximately vertical and holds the milker parts in open position, and draws the parts together and downward when the operating rod is forced out along the cam portion 57 or a like section of the rail and brings the rod to an inclined position. The guide rail constitutes cams suitably secured to the top of the turntable, preferably by means of thin legs 59 having feet 60. In some cases the rail may have horizontal portions 61 and upwardly curved portions 62, as indicated in Fig. 8. It should be understood that the inner side of the guide head 15 and the tube 17 may be suitably treated so as to be sanitary, as by covering the surface or plating it with suitable metal. Also it should be understood that the rods 44 may be provided with anti-friction devices to effect rolling contact with the guide rail.

The front side of the motor housing 8 is provided with a journal box 63, and the milker stand or box side 2 supports a bearing bracket 64 which steadies a shaft 65 mainly supported rotatably in the box 63, the shaft having a gear wheel 66 secured thereto. The front of the housing supports also a journal box 67 in which a shaft 68 is rotatably supported, the shaft having a pinion 69 fixed thereto that meshes with the gear wheel 66. A crank arm 70 is connected to the outer end of the shaft 68 to enable the crank arm to rotate the shaft in one direction. A spring 71 is wrapped about the shaft 65 and is secured at its inner end to the shaft, the outer end of the spring being secured to the housing. A ratchet wheel 72 is secured to the shaft 65 and a driving gear wheel 73 is arranged rotatably on the shaft and has a pawl 74 mounted thereon that operates in connection with the ratchet wheel. The wheel 73 operates through a slot 75 in the top 9 in connection with the gear teeth 27 on the turntable.

It should be understood that the motor may be variously constructed and its power variously applied to the turntable, and that various modifications may readily be made as to the connections between the turntable, the guide head 15 and the top of the stand. In case it is not desired to place a receiving vessel in or under the stand a suitable conduit 76 is connected to the lower end of the guide tube 17 to conduct the milk away to a vessel where desired.

In practical use, the milker is properly placed below the udder of a cow and the teats are inserted in the milkers, the manipulator parts being adjusted relatively to the operating rods 44 if necessary when the teat is thicker or smaller than the average. The motor is started and it rotates the turntable which in effect operates as a gear wheel and moves the guide rail to actuate and control the operating rods 44. When the simple motor illustrated has been adopted the crank arm 70 is turned to wind up the spring 71, the ratchet wheel 72 turning freely in contact with the pawl 74, permitting the wheel 73 to remain at rest. Having wound up the spring, the crank arm is released and the spring causes the shaft 65 to rotate and the ratchet wheel to be turned in the opposite direction, the ratchet wheel engaging the pawl and causing the wheel 73 to rotate the turntable. As the turntable rotates the guide rail causes the required movements of the operating rods 44 to push up the milkers against the udder of the cow and immediately draw the working portions of the milkers so as to press on the teats and draw them downwards, resulting in milk being drawn out and conducted away through the channels herein-before described. While the milking of a cow is expeditiously proceeding, the attendant may set and start other milking machines to milk other cows and thus minimize the cost of attendants, the attendant returning and removing the milkers that may have completed their operations.

Having described the invention, what is claimed is:—

1. A milking machine including a stand and a hollow guide head secured thereto, a plurality of milkers comprising main parts hinged to the upper portion of the guide head and manipulator parts pivoted to the main parts, the main parts having discharge tubes extending into the guide head, a plurality of operating rods connected to the manipulator parts respectively, and a turntable rotatable upon the stand and about the guide head and having cams to operate the operating rods.

2. In a milking machine, the combination with a stand, of a hollow guide head supported stationarily relatively to the top of the stand, an annular turntable guided to rotate upon the stand and about the guide head, a guide rail having legs secured upon the turntable, the rail having reversely arranged arcuate cam portions, a plurality of bridge bars stationarily supported by the stand and extending above the guide rail transversely of the rail, a plurality of milkers main parts hinged to the guide head and having each a conduit extending into the head, a plurality of manipulator parts pivoted to said main parts respectively to co-operate therewith, and a plurality of operating rods secured to the manipulator parts respectively and having loose guided connections with the guide rail and the bridge bars.

3. In a milking machine, a milker apparatus comprising a main part having a hinge on its normally lower portion, said portion being hollow, the remaining portion of the part above the hollow portion having a longitudinally and transversely curved concave working face, said part having a jaw at the normally lower portion of said face, a manipulator part having an ear at a distance from the normally lower end thereof, said ear being pivoted to said jaw, the normally upper portion of the manipulator part having a convex working face above said ear that is curved longitudinally and transversely to operate opposite to the face on said main part, and an operating rod connected to the normally lower portion of said manipulator part.

4. In a milking machine, the combination of a stand, an annular bearing box rigidly supported by the stand, an annular turntable rotatably supported by the bearing box, a hollow guide head arranged upon the turntable and having a guide tube thereon that extends axially through the turntable and the bearing box, a plurality of bridge bars horizontally arranged and rigidly secured to the stand and guide head, milker main parts hinged to the guide head and adapted to discharge into the head, thumb-like manipulator parts pivoted to said main parts respectively, a guide rail rigidly supported upon the turntable and extending under the bridge bars, the guide rail having reversely curved portions, and operating rods secured to the manipulator parts respectively and having movable connections with the guide rail and also sliding contact with the bridge bars respectively.

In testimony whereof, I affix my signature on the 20 day of August 1923.

DELANA R. CHILDRESS